A. W. MATHYS.
APPARATUS FOR COOLING AND OTHERWISE TREATING GASES WITH LIQUIDS.
APPLICATION FILED NOV. 8, 1916.
1,275,583.
Patented Aug. 13, 1918.
3 SHEETS—SHEET 3.
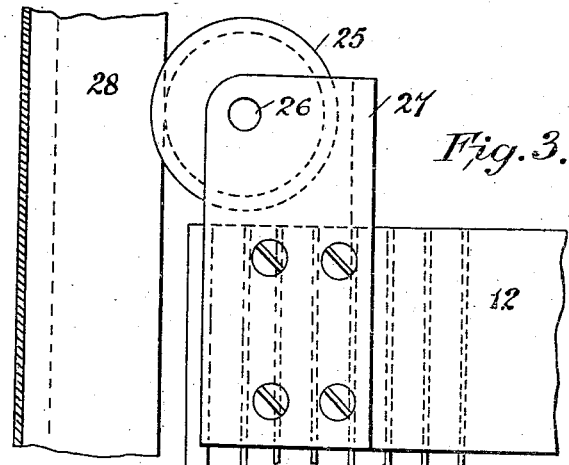
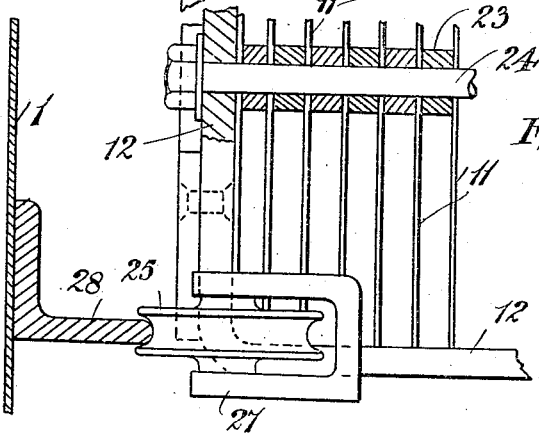
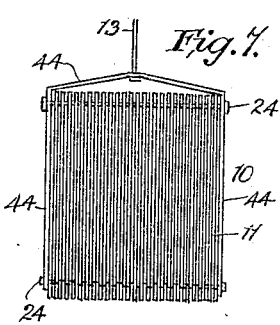
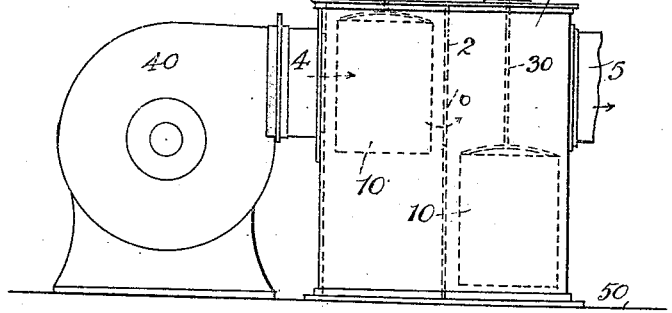

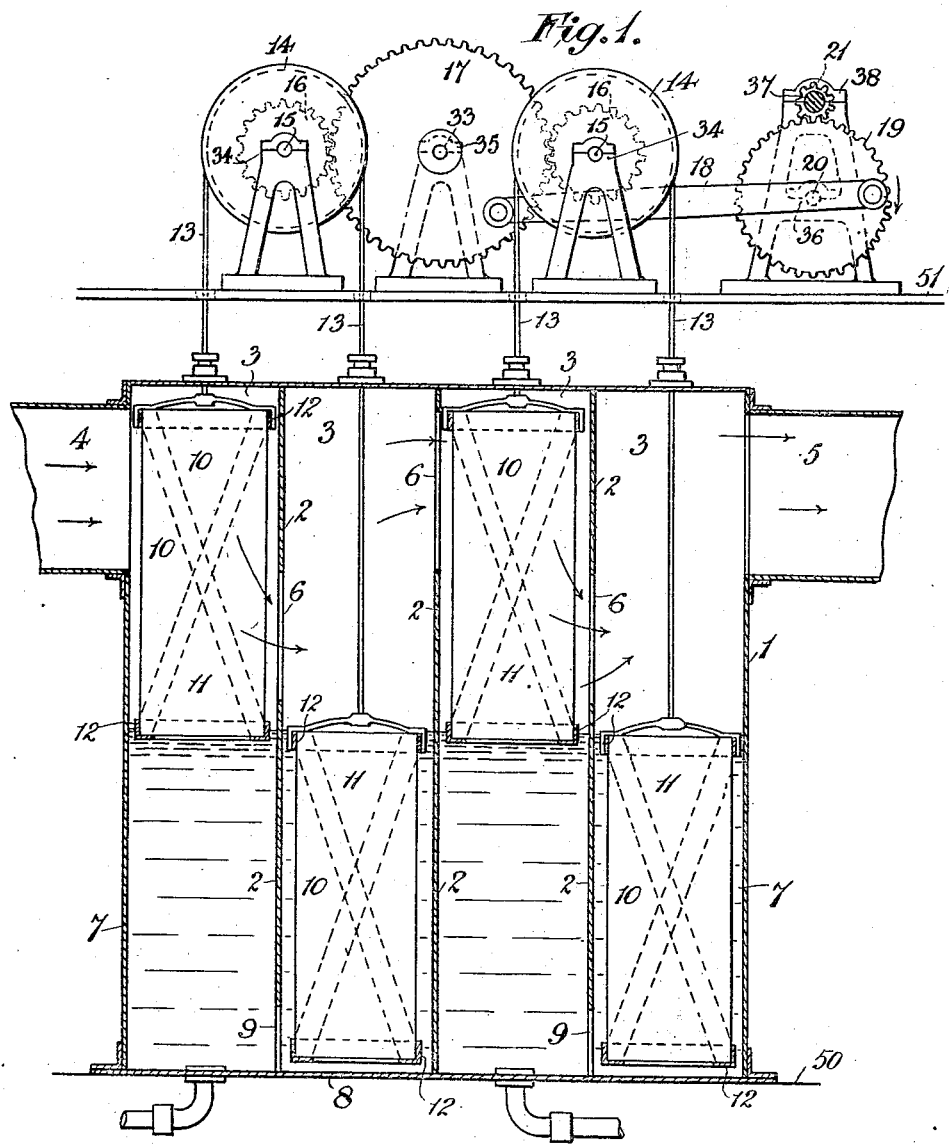

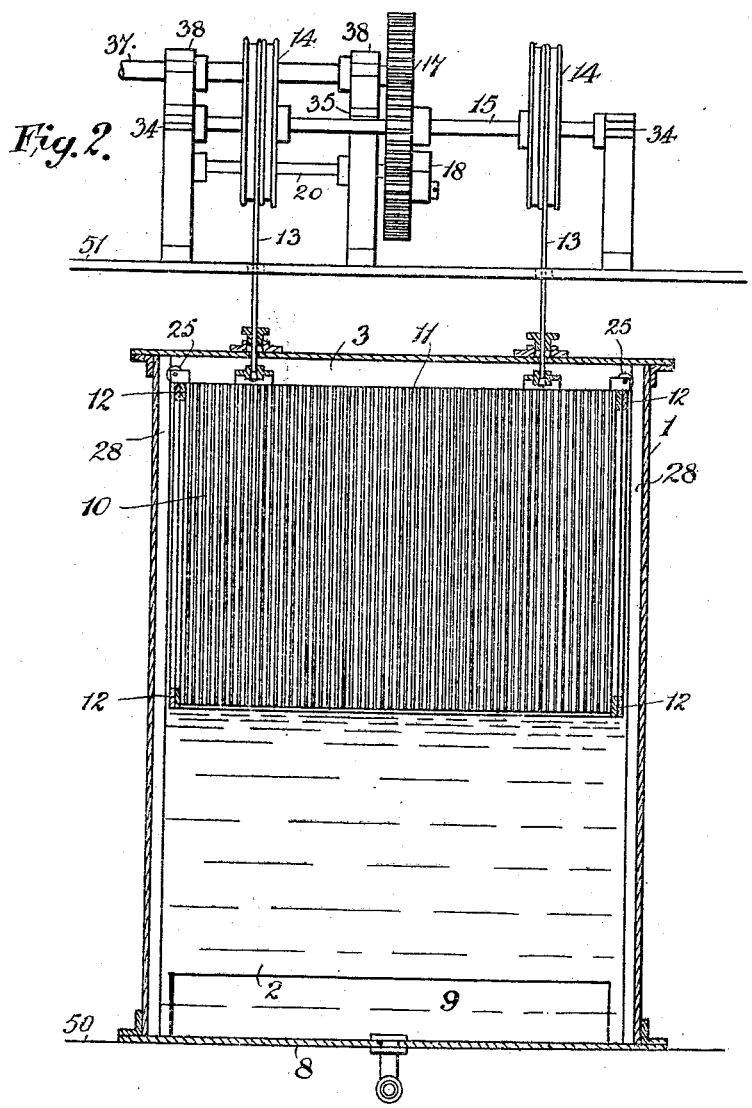

UNITED STATES PATENT OFFICE.

ALBERT WILLIAM MATHYS, OF CATFORD, LONDON, ENGLAND.

APPARATUS FOR COOLING AND OTHERWISE TREATING GASES WITH LIQUIDS.

1,275,583.      Specification of Letters Patent.     Patented Aug. 13, 1918.

Application filed November 8, 1916. Serial No. 130,246.

*To all whom it may concern:*

Be it known that I, ALBERT WILLIAM MATHYS, a subject of the King of Great Britain, residing at Catford, London, England, have invented certain new and useful Improvements in Apparatus for Cooling and Otherwise Treating Gases with Liquids, of which the following is a specification.

This invention relates to apparatus for treating gases with liquids, for example for humidifying air for use in factories, theaters and other buildings, for cooling air for use in the cooling of electrical machinery, or for scrubbing gases or cleaning air or other gases of dust or like impurities, or further for treating air or other gases with hydrocarbons or other volatile liquids.

The object of the present invention is to provide an apparatus which is efficient in operation, compact in form, and will preferably permit of the use in its construction of material of standard sizes or will enable material of stock sizes to be readily cut into pieces available for use in its construction with a minimum of waste and with the aid of usual tools or appliances.

In other words, it is one of the objects to avoid the necessity of expensive plant for shaping or forming the surface plates which are used in the preferred embodiment of the invention and to avoid thereby the cost entailed in shaping the surface plates used in some known apparatus of a similar class, wherein rotary circular or spirally wound cylindrical plates are used.

Another advantage of the invention is that it enables vertical plates to be used which, as they are drawn up out of the water or other liquid permit excess liquid to drain off thereby insuring a very thin even film of moisture and avoiding drops of water likely to be carried over in suspension.

In the drawings

Figures 1 and 2 are respectively a side elevation and a front elevation of one form of apparatus according to the invention, part of the apparatus being shown in section in each instance.

Figs. 3 and 4 are respectively a side view and a sectional plan on an enlarged scale of details connected therewith.

Fig. 5 is a side elevation of another form of apparatus.

Fig. 6 is a side elevation partly in section of a further form,

Fig. 7 being a view of one of the reciprocatory elements used therein.

In the form of apparatus illustrated by Figs. 1 and 2, which is suitable for humidifying air, cooling air by contact with water or for like purposes, a casing 1, which may be conveniently made of metal plates is divided by partitions 2, into a number of air compartments 3. The casing 1 has an air inlet 4 at the front and an air outlet 5 at the rear. The partitions 2 have openings 6 arranged alternately at different levels. The lower part 7 of the casing forms a tank for water. The partitions 2 extend downwardly into the tank so that their lower edges are always below the water level. The partitions 2 below the water level may reach to the bottom 8 of the tank or may stop short thereof so as to leave openings 9 in order that the water may maintain its level automatically on both sides of each partition. In an apparatus as shown, where there are four compartments, the central partition 2 may be solid so that the tank may be divided. The water or other liquid in the front part of the tank so divided by the solid central partition may then be different to that in the rear part.

A plurality of reciprocatory members 10 are arranged in the casing 1, and means are provided to lower them into the tank and to raise them therefrom so that they are wetted by the water in the tank and when wetted are exposed to the air passing through the air compartments 3 of the air space above which air is thereby humidified, and cooled. Any dust settling on the reciprocatory members is washed off each time said members are immersed in the tank. Each reciprocatory member comprises a large number of surfaces, for instance in the example shown it comprises a number of narrowly spaced thin metal plates 11, preferably set on edge vertically in a skeleton or cage 12. Each cage is suspended by cables 13, 13, passing over pulleys 14, 14, mounted on shafts 15, the adjacent cages 12 being preferably connected in pairs by the cables 13, 13, so that one cage substantially balances the other. The cages 12 of each pair are preferably arranged to rise and fall alternately one in each air compartment 3, and by the adoption of suitable dimensions in the relative sizes of the cages 12 and openings 6, assurance may be given that the air passing therethrough shall always come into contact with wet plates 11. By arranging the openings 6 alternately at different levels the air is compelled to take a zig-zag course and will therefore be longer in contact with wetted surfaces. Suitable means are provided to rotate the pulleys alternately in different directions to impart the required rising and falling movements to the cages 12, for instance the two shafts 15 are provided with spur wheels 16, meshing with a spur wheel 17 on a shaft 33. The wheel 17 is connected by a rod 18 to a toothed wheel 19 on a shaft 20 suitably rotated continuously, for instance by a pinion 21, on a shaft 37 driven from any convenient source of power. The shafts 15 are suitably mounted in bearings 34, the shaft 33 in bearings 35, the shaft 20, in bearings 36 and the shaft 37 in bearings 38. The bearings may be supported in any convenient manner according to the structure or building in which the apparatus is situated. By the mechanism above described the wheel 17 will be oscillated and through the medium of the wheels 16 will rotate the pulleys 14 first in one direction and then in the other.

By using a crank disk and connecting rod as described the velocity of the cages 14, will be at a minimum as they approach the end of each upward and downward movement. The plates 11 may be spaced apart by suitable means for instance as indicated in Fig. 4 by washers 23, on bolts 24 which may pass through the plates and secure them in their cages. The invention is not limited to any particular thickness for the washers, the thinner the washers the closer the plates may be packed and the greater the total area of wetted surfaces. Anti-friction rollers 25 conveniently carried by pins 26 in brackets 27 mounted on each cage, run in contact with guide rails 28 secured to the casing 1.

In the form shown in Fig. 5 only two reciprocatory members 10 are shown. They are suspended by chains 29 and rods 30 instead of cables. The chains pass over sprocket wheels 31. The rods 30 pass through glands 32. Otherwise the parts shown in Fig. 5 are similar to the corresponding parts indicated by similar numerals in Figs. 1 and 2.

In the further form of apparatus shown in Figs. 6 and 7 the reciprocatory elements 10 comprise comparatively narrow plates 11. For simplicity the plates 11 are shown connected by bolts 24 to frames 44 suspended by cables 13, a single cable 13 being used for each element 10. The plates 11 may be spaced apart by any suitable means for instance by washers as hereinbefore described with reference to Fig. 4. The cable 13 for the outer elements 10 passes over a pulley 14', mounted in a shaft 15, while the cable 13 for the inner elements 10 passes over a pulley 14'' mounted on a shaft 43. The two shafts 15 and 43 are connected by toothed wheels 41, 42, the gear ratio being such as to insure adequate rotation of the pulley 14'' to give the necessary reciprocatory movement to the elements moved by it. A toothed segment 17 drives a wheel 16 on the shaft 15, the segment being oscillated by suitable means such as that hereinbefore described with reference to the wheel 17 in Figs. 1 and 2, other parts being similarly lettered to the corresponding parts in those figures.

It will be understood that the cables 13, Figs. 1 and 2, or chains 29, Fig. 5, may be of any suitable length so that the driving mechanism may be mounted in any convenient relation to the casing 1 to suit the space available, for instance the casing 1 may be on one floor 50 of a building and the driving mechanism on the next floor 51 above it.

It will also be understood that any means well known in the art such as a fan 40, Fig. 5, may be used for forcing or inducing a current of air or other gas through the apparatus and thereby directing the gas into contact with the many wetted surfaces, i. e., the plates of the reciprocatory members.

By using thin metal plates 11 of rectangular form, the cost of manufacture is considerably reduced, as the plates can be of standard size or easily cut from stock. They can be easily set in the cages, and a large number of thin plates can be arranged in each cage close together to form narrow air passages whereby the air split into numerous thin strata is brought into intimate contact with a large total area of wetted surface.

I claim:—

1. Apparatus for treating gases with liquids, comprising a tank for liquid, a series of members each comprising a number of thin plates spaced apart to form narrow passages, a partition between each pair of the adjacent members, said partition having an opening therein above the level of liquid in the aforesaid tank, and means for alternately raising and lowering the members situated on opposite sides of said partition, substantially as and for the purpose hereinbefore set forth.

2. Apparatus for treating air with liquid comprising in combination, a casing, a tank for liquid in the lower part of said casing, an air space in the upper part of said casing, partitions dividing said air space into compartments, said partitions having openings forming communications between said compartments, a series of reciprocatory members in said casing and arranged successively behind said partitions, said members comprising thin plates spaced apart, and means for lowering and raising said members into the tank and up into said compartments, substantially as and for the purpose hereinbefore set forth.

3. Apparatus for treating gases comprising a casing adapted to contain liquid in its lower part and gas in its upper part, partitions dividing said upper part into compartments, said partitions having openings alternately at higher and lower levels, reciprocatory members in said compartments each comprising a number of thin plates, and means for alternately raising and lowering said members into the liquid in the lower part of the casing and up into the gas in the upper part, and adjacent to said openings, and means for passing a current of gas through the upper part of said casing, substantially as hereinbefore set forth.

4. Apparatus for treating air with water, comprising a casing containing an air chamber and a water tank, partitions dividing said air chamber into a series of compartments, the aforesaid partitions having openings connecting said compartments, a reciprocatory member in each compartment comprising a plurality of narrowly spaced plates, a water tank, means for raising and lowering said reciprocatory members past said openings whereby air passing therethrough is compelled always to pass into contact with the plates of said members, substantially as hereinbefore set forth.

In testimony whereof I have signed my name to this specification in the presence of two subscribing witnesses.

ALBERT WILLIAM MATHYS.

Witnesses:
 HELEN MATHYS,
 ANNIE M. MARTIN.

Copies of this patent may be obtained for five cents each, by addressing the "Commissioner of Patents, Washington, D. C."